US009752706B2

(12) United States Patent
Bauerdick et al.

(10) Patent No.: US 9,752,706 B2
(45) Date of Patent: Sep. 5, 2017

(54) SEALED TRANSVERSE LOCKING PIPE AND FITTINGS (71) Applicants: Jan Bauerdick, Mansfield, OH (US);
Don Smith, Mt. Gilead, OH (US);
Thomas J. Moses, Elmhurst, IL (US);
Jeffrey A. Koller, Elmhurst, IL (US)

(72) Inventors: Jan Bauerdick, Mansfield, OH (US);
Don Smith, Mt. Gilead, OH (US);
Thomas J. Moses, Elmhurst, IL (US);
Jeffrey A. Koller, Elmhurst, IL (US)

(73) Assignee: FAMOUS INDUSTRIES, INC., Akron, OH (US)

( * ) Notice: Subject to any disclaimer, the term of this patent is extended or adjusted under 35 U.S.C. 154(b) by 56 days.

(21) Appl. No.: 14/020,611

(22) Filed: Sep. 6, 2013

(65) Prior Publication Data
US 2014/0070527 A1 Mar. 13, 2014

Related U.S. Application Data (63) Continuation of application No. 13/626,431, filed on Sep. 25, 2012, now abandoned.
(Continued)

(51) Int. Cl.
*F16L 9/17* (2006.01)
*F16L 13/11* (2006.01)
(Continued)

(52) U.S. Cl.
CPC .............. *F16L 9/17* (2013.01); *F16L 13/116* (2013.01); *F16L 13/16* (2013.01); *F16L 25/08* (2013.01); *F24F 13/0209* (2013.01)

(58) Field of Classification Search
CPC ....... F24F 13/0209; F16L 25/08; F16L 13/16; F16L 13/116; F16L 9/17
(Continued)

(56) References Cited

U.S. PATENT DOCUMENTS 572,076 A 11/1896 Smith
2,147,775 A 2/1939 Miller et al.
(Continued)

FOREIGN PATENT DOCUMENTS

JP 4906973 * 3/2012 ............. F16L 21/08

OTHER PUBLICATIONS

International Search Report and Written Opinion for corresponding International Application No. PCT/US2013/50462, dated Dec. 12, 2013.
(Continued)

*Primary Examiner* — Gregory Binda
*Assistant Examiner* — Zachary Dragicevich
(74) *Attorney, Agent, or Firm* — Matthew P. Frederick; Cheryl L. Gastineau; Reed Smith LLP (57) ABSTRACT A pipe and fitting coupling system includes a first pipe, a second pipe, and a joint. A receiving end of the second pipe includes a first flange, a second flange, a groove, and a sealant. The second flange extends further than the first flange. The groove is disposed at the pipe diameter and between the first flange and the second flange. The first flange has an inwardly angled face to meet the groove and the second flange has an outwardly angled face to meet the groove. The sealant is disposed in the groove to seal the plain end of the first pipe in the receiving end. The joint is formed by the cooperative alignment of the plain end being inserted into the receiving end and being sealed by the sealant.

32 Claims, 7 Drawing Sheets

Related U.S. Application Data (60) Provisional application No. 61/698,146, filed on Sep. 7, 2012, provisional application No. 61/698,370, filed on Sep. 7, 2012.

(51) Int. Cl.
*F16L 13/16* (2006.01)
*F16L 25/08* (2006.01)
*F24F 13/02* (2006.01)

(58) Field of Classification Search
USPC .......................................... 285/424
See application file for complete search history.

(56) References Cited

U.S. PATENT DOCUMENTS

| | | | |
|---|---|---|---|
| 2,650,112 | A | 8/1953 | Kinkead |
| 4,099,747 | A * | 7/1978 | Meserole ................. 285/148.15 |
| 4,906,028 | A | 3/1990 | Yokomatsu et al. |
| 5,988,704 | A | 11/1999 | Ryhman |
| 7,393,021 | B1 | 7/2008 | Lukjani |
| 7,992,904 | B2 * | 8/2011 | Bloom et al. ................. 285/424 |
| 2001/0026048 | A1 * | 10/2001 | Proctor .................. F16L 21/02 |
| | | | 277/603 |
| 2003/0108381 | A1 | 6/2003 | Walsh et al. |
| 2004/0250403 | A1 * | 12/2004 | Issagholian-Havai .......... 29/450 |
| 2008/0017269 | A1 | 1/2008 | Gudenburr et al. |

OTHER PUBLICATIONS

International Search Report and Written Opinion for corresponding International Application No. PCT/US2013/58575, dated Feb. 11, 2014.

\* cited by examiner

SEALED TRANSVERSE LOCKING PIPE AND FITTINGS

CROSS-REFERENCE TO RELATED APPLICATIONS

This application is a non-provisional of, and claims the benefit under 35 U.S.C. §119(e) of the earlier filing dates of U.S. Provisional Application No. 61/698,146 filed Sep. 7, 2012, and U.S. Provisional Application 61/698,370, filed Sep. 7, 2012, the disclosures of which are incorporated by reference herein; and this application is also a continuation-in-part of, and claims the benefit under 35 U.S.C. §120 of the earlier filing date of U.S. patent application Ser. No. 13/626,431 filed Sep. 25, 2012, the disclosure of which is also incorporated by reference herein.

FIELD OF THE INVENTION

The present invention generally relates to a coupling for a pipe. More particularly, the present invention pertains to a coupling system and method for a sheet metal pipe and fitting or duct.

BACKGROUND OF THE INVENTION

Products used in heating/ventilation/air conditioning (HVAC) units are typically formed of sheet stock such as sheet metal. Examples of metals include steel, aluminum and the like. In particular, pipe or duct work for HVAC units is typically made from one or more sections of sheet stock that are formed to create a conduit. In general, duct work or conduit may have a round and/or rectangular cross section. The sections of steel conduit are joined to create the duct work. Seams are created along each pipe section where the sheet stock is joined resulting in steel against steel joint. These seams result in inefficiency of the HVAC unit as a result of the loss of heated or cooled air escaping the duct work through the seams. Similarly, when two sections of pipe are joined, this joint is typically a steel against steel joint.

Numerous attempts have been made to address this inefficiency. For example, tapes have been applied over the seams to reduce the loss of heated or cooled air through the seam. Tapes reduce a portion of the heated or cooled air that escapes through the seam. However, inefficiencies in the HVAC unit still result. Mastics have also been used to fill a portion of the seam to reduce an amount of heated or cooled air escaping through the seam. Additionally, applying tapes and mastics to HVAC products is labor intensive and often involves hours of cure time.

Another method of sealing HVAC products uses a butyl (rubber) gasket. The gasket is injected or pressed into the seam of the product to reduce the loss of heated or cooled air through the seam. Butyl, however, has several disadvantages. For example, butyl takes a long time to cure, breaks down over time, and requires replacement.

Accordingly, it is desirable to provide a pipe and fitting coupling system and method capable of overcoming the disadvantages described herein at least to some extent.

SUMMARY OF THE INVENTION

The foregoing needs are met, to a great extent, by the present invention, wherein, in some respects a pipe and fitting coupling system and method is provided.

An embodiment of the present invention pertains to a pipe and fitting coupling system. The pipe and fitting coupling system includes a first pipe, a second pipe, and a joint. The first pipe has a pipe diameter and a plain end. The second pipe has a receiving end. The receiving end is a single piece of shaped sheet metal. The receiving end includes a first axial flange, a second axial flange, an axial groove, and a sealant. The first axial flange has a first flange diameter that is greater than the pipe diameter. The second axial flange has a second flange diameter that is less than the pipe diameter. The second axial flange extends further axially than the first axial flange. The axial groove is disposed at the pipe diameter and between the first axial flange and the second axial flange. The first axial flange has an inwardly angled face to meet the axial groove and the second axial flange has an outwardly angled face to meet the axial groove. The sealant is disposed in the axial groove to seal the plain end in the receiving end. The joint is formed by the cooperative alignment of the plain end being inserted into the receiving end and being sealed by the sealant.

Another embodiment of the present invention pertains to a method of making a pipe and fitting coupling system. In this method, a plain end is formed in a first pipe having a pipe diameter. A receiving end is formed in a second pipe. The receiving end is a single piece of shaped sheet metal. Forming the receiving end includes the steps of forming a first axial flange, forming a second axial flange, forming an axial groove and disposing a sealant in the axial groove. The first axial flange is formed having a first flange diameter that is greater than the pipe diameter. The second axial flange is formed having second flange diameter that is less than the pipe diameter. The second axial flange extends further axially than the first axial flange. The axial groove is formed at the pipe diameter and between the first axial flange and the second axial flange. The first axial flange is formed with an inwardly angled face to meet the axial groove and the second axial flange is formed with an outwardly angled face to meet the axial groove. The sealant is disposed in the axial groove to seal the plain end in the receiving end.

Yet another embodiment of the present invention pertains to a method of coupling a plurality of components in a pipe and fitting coupling system. In this method, a plain end of a first pipe is oriented with a receiving end of a second pipe. The plain end has a pipe diameter. The receiving end is a single piece of shaped sheet metal that includes a first and second axial flange, an axial groove, and a sealant. The first axial flange has a first flange diameter that is greater than the pipe diameter. The second axial flange has second flange diameter that is less than the pipe diameter. The second axial flange extends further axially than the first axial flange. The axial groove is disposed at the pipe diameter and between the first axial flange and the second axial flange. The first axial flange has an inwardly angled face to meet the axial groove and the second axial flange has an outwardly angled face to meet the axial groove. The sealant is disposed in the axial groove to seal the plain end in the receiving end. The plain end is telescopically slid over the second axial flange. The plain end is cooperatively aligned with the axial groove and a joint is formed by urging the plain end against the sealant.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

The present invention provides a heating, ventilation and air conditioning (HVAC) pipe and fitting coupling system and method. In some embodiments, the invention provides for a pipe and fitting coupling that is easier and faster to use than conventional pipe and fitting couplings. These improvements are due, in part, to the ability to form a seal that does not require duct tape, mastics, or the like. For example, embodiments of the present invention provide a seal that is substantially airtight and that is formed by simply inserting a straight cut end of one pipe or fitting into the coupling end of another pipe or fitting. For the purpose of this disclosure, the term, "substantially air tight" refers to a seal that is in accordance with Sheet metal and Air Conditioning Contractors National Association (SMACNA) Seal Class and/or Leakage Class specification. More particularly, "substantially air tight" refers to a seal that is accordance with SMACNA Seal Class A and/or B and Leakage Class 6 and/or 3. Specifically, "substantially air tight" refers to a round pipe seal that is accordance with SMACNA Leakage Class 3 and a rectangular metal duct seal that is accordance with SMACNA Leakage Class 6. Embodiments of the present invention provide a transverse pipe and fitting coupling joint. For the purposes of this disclosure, the term, "transverse" refers to an orientation that is transverse or 90° to a central axis of the pipe and fitting.

Other embodiments in accordance with the present invention provide a method of making a pipe and fitting coupling system. In this method, a receiving end is formed on one pipe or fitting to receive a plain end of another pipe or fitting to form a joint. A sealant placed in a groove of the receiving end facilitates the substantially air tight seal. To secure the joint, the pipe and fitting coupling system may include a lock, such as a snap lock or button lock that secures the ends together. Alternatively or in addition to the lock, the joint may be secured by a fastener, such as a sheet metal screw, is placed at the joint. In forming the joint, the plain end telescopes over a portion of the receiving end and the fastener secures these two ends from sliding apart. In a particular example, the fastener is a sheet metal screw, such as a self-tapping sheet metal screw or the like, configured to pierce both pipes at the joint and thereby secure the joint.

Advantages of various embodiments of the invention include, for example: (1) speeding installation time of an HVAC system; (2) reducing loss of conditioned air; and (3) reducing installation costs by elimination of duct tape and mastic.

Figure 1:
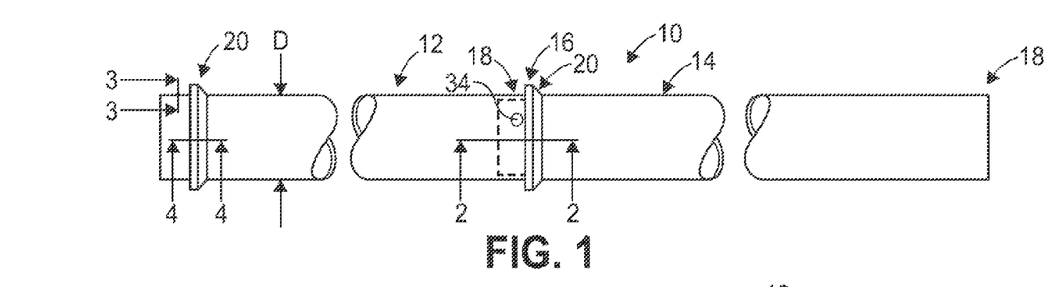
FIG. 1 is a schematic view of a portion of a duct system according to an embodiment of the invention.

The invention will now be described with reference to the drawing figures, in which like reference numerals refer to like parts throughout. As shown in FIG. 1, a pipe and fitting coupling system 10 includes a first pipe 12, a second pipe 14, and a joint 16. In addition to the straight pipes shown, the pipe and fitting coupling system 10 may include any suitable pipe and/or fitting known to those skilled in the art. Examples of suitable pipes and fittings include round and rectangular pipes, small and large radius elbow joints, 'Y' joints, 'T' joints, registers, and the like. Thus, for the sake of brevity, the term, "pipe 12" and "pipe 14" are used throughout the present disclosure and the figures depict a round pipe. However the embodiments of the invention are not limited to round pipes, but rather, the terms, "pipe 12" and "pipe 14" refer to round and rectangular pipe and fittings for the same.

To continue, the first pipe 12 has a pipe diameter D and a plain end 18. The second pipe has a receiving end 20. The receiving end is a single piece of shaped sheet metal. In general, the metal may include any suitable metal. Examples of suitable metals include steel, aluminum, alloys, and the like. In addition, the pipes 12 and/or 14 and receiving end 20 may be made of any other suitable material. Examples of suitable materials include malleable, injectable, and/or moldable materials such as, for example, plastics and other polymers, resins, and the like.

Figure 2:
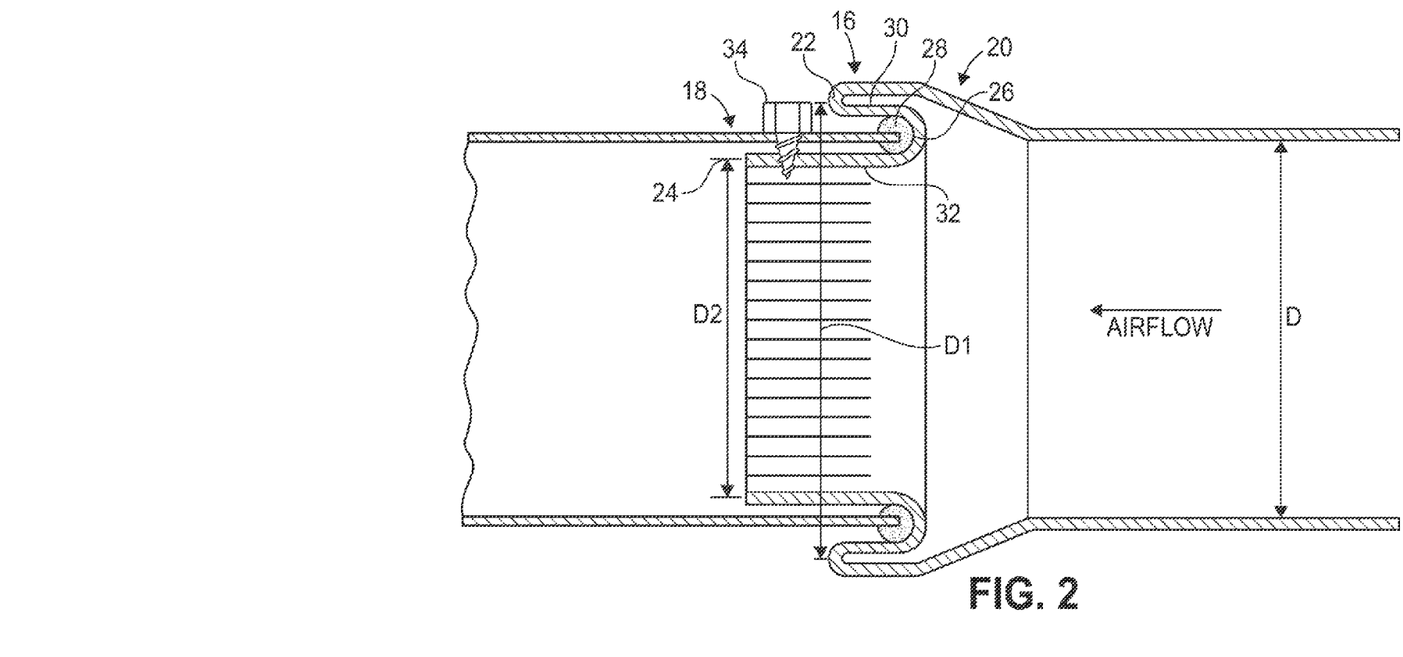
FIG. 2 is a cross-sectional view taken along line 2-2 of FIG. 1.

As shown in FIG. 2, the receiving end 20 includes a first axial flange 22, a second axial flange 24, an axial groove 26, and a sealant 28. In general, the axial flanges 22 and 24 facilitate positioning the plain end 18 in the axial groove 26.

The sealant 28 includes any suitable elastomeric, resilient, or otherwise malleable material that is capable of forming and maintaining a seal with the plain end 18. Particular examples of suitable materials include butyl rubber and the like. The first axial flange 22 has a first flange diameter D1 that is greater than the pipe diameter D. The second axial flange 24 has a second flange diameter D2 that is less than the pipe diameter D. The second axial flange 24 extends further axially than the first axial flange 22. As described herein, this axial extension of the second axial flange 24 facilitates securing the plain end 18 of the first pipe 12 in the receiving end 20 of the second pipe 14.

The axial groove 26 is disposed at the pipe diameter and between the first axial flange 22 and the second axial flange 24. To facilitate telescoping the plain end 18 into the receiving end, the first axial flange 22 has an inwardly angled face 30 to meet the axial groove 26 and the second axial flange 24 has an outwardly angled face 32 to meet the axial groove 26. These angled faces 30 and 32 simplify the task of aligning the two ends 18 and 20 and initiating the telescoping of the plain end 18 towards the axial groove 26. As shown in FIG. 2, axial groove 26 has two legs connected by a base. The first flange 22 and the second flange 24 each form one of the two legs. The sealant 28 is disposed in the base of the axial groove 26 to seal the plain end 18 in the receiving end 20. The joint 16 is formed by the cooperative alignment of the plain end 18 being inserted into the receiving end 20 and being sealed by the sealant 28.

Also shown in FIGS. 1 and 2 is a fastener 34. As shown in FIG. 2, the fastener 34 is configured to pierce a wall of the plain end 18 and a wall of the second axial flange 24. In this manner, the plain end 18 may be secured in the receiving end 20. In general, the fastener 34 includes any suitable fastener. Examples of suitable fasteners include screws, pop-rivets, and the like. In a particular example, the fastener 34 is a self-tapping metal screw.

Figure 3:
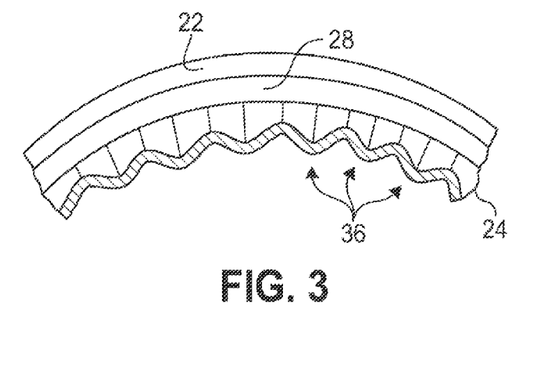
FIG. 3 is a cross-sectional view taken along line 3-3 of FIG. 1.

FIG. 3 is a cross-sectional view taken along line 3-3 of FIG. 1. As shown in FIG. 3, the second axial flange 24 includes a series of crimps 36 disposed about the circumference of the second axial flange 24. The series of crimps 36 are configured to provide a taper in the second axial flange 24. As such, the second axial flange is formed into a portion of a cone, e.g., a frusto-conical segment to facilitate telescopically sliding the plain end 18 over the second axial flange 24 and into the axial groove 26. In various embodiments of the invention, the size or width of each crimp of the series of crimps 36 is about 2 mm to about 15 mm. More particularly, each crimp is about 4 mm wide.

Figure 4:
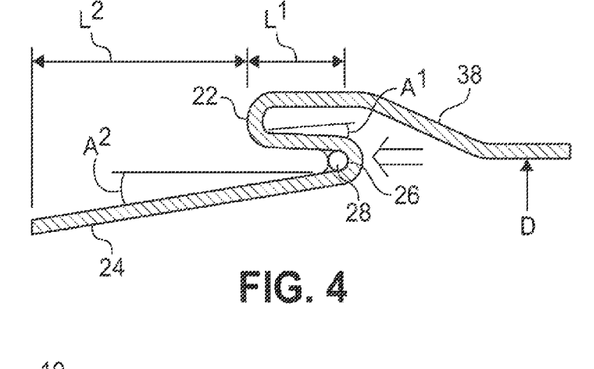
FIG. 4 is a cross-sectional view taken along line 4-4 of FIG. 1.

FIG. 4 is a cross-sectional view taken along line 4-4 of FIG. 1. As shown in FIG. 4, the inwardly angled face 30 of the first axial flange 22 includes an angle $A^1$. In general, the angle A1 includes any suitable angle. More particularly, the angle $A^1$ is about 1° to about 15° to facilitate telescopically sliding the plain end 18 into the axial groove 26. More particularly still, the angle $A^1$ is about 10°. The outwardly angled face 32 of the second axial flange 24 includes an angle $A^2$. In general, the angle $A^2$ includes any suitable angle. More particularly, the angle $A^2$ is about 1° to about 15° to facilitate telescopically sliding the plain end 18 into the axial groove 26. More particularly still, the angle $A^2$ is about 5°.

Also shown in FIG. 4, the first axial flange 22 extends a length $L^1$ past a bottom or proximal portion of the axial groove 26. The length $L^1$ includes any suitable length. In general, the length $L^1$ may vary from about ¼ inch (0.6 cm) to about ½ inch (1.3 cm). The second axial flange 24 extends a length $L^2$ past a distal end of the first axial flange 22. In general, the length $L^2$ is to provide sufficient area to secure the fastener 34. Depending upon the type of fastener utilized, the length $L^2$ may vary from about 1 cm to about 5 cm. In a particular example, the length $L^2$ is about 2.54 cm.

Figure 5:
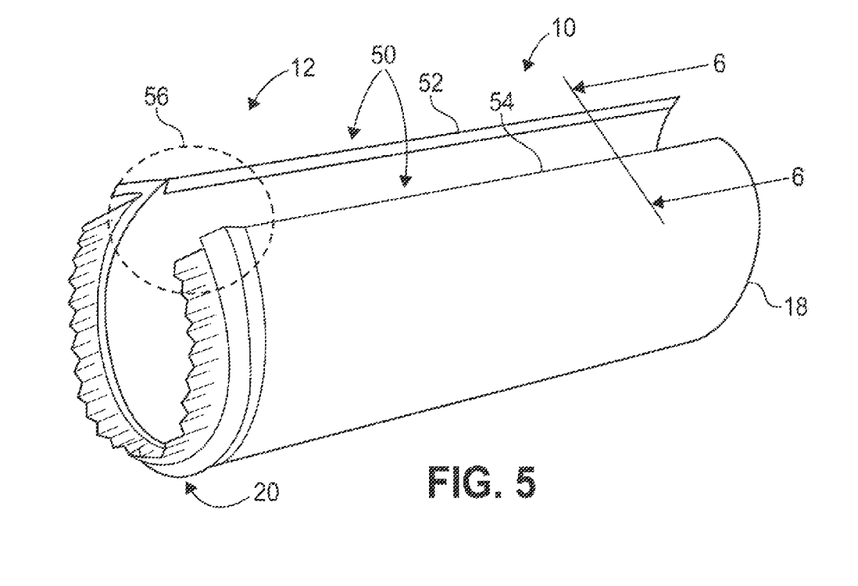
FIG. 5 is an isometric projection of a pipe of FIG. 1.

FIG. 5 is an isometric projection of the pipe 12 of FIG. 1. As shown in FIG. 5, the pipe 12 includes a longitudinal lock 50. The longitudinal lock 50 includes a male portion 52 and female portion 54. Also shown in FIG. 5 is an intersection zone 56 where the receiving end 20 (e.g., the transverse seal) intersects with the longitudinal lock 50. It is at this intersection zone 56 that the pipe and fitting coupling system 10 has the greatest tendency to leak. In order to offset this leakage tendency, additional sealant, such as the sealant 28, may be utilized as described herein.

Figures 6A, 6B:
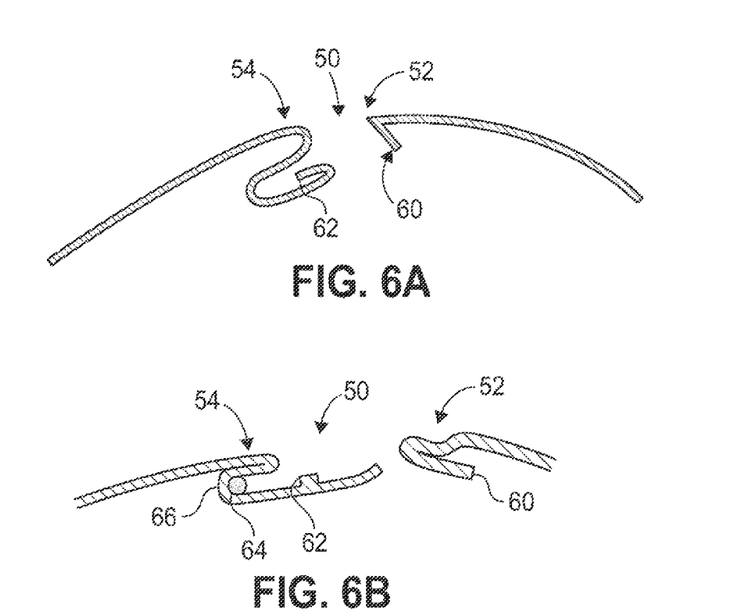
FIG. 6A is a cross-sectional view taken along line 6-6 of FIG. 5 in accordance with an embodiment of the invention.
FIG. 6B is a cross-sectional view taken along line 6-6 of FIG. 5 in a locked configuration in accordance with the embodiment of FIG. 6A.

FIG. 6A is a cross-sectional view taken along line 6-6 of FIG. 5 in accordance with an embodiment of the invention. As shown in FIG. 6A, the male portion 52 includes a hem 60 and the female portion 54 includes a locking groove 62. As shown in FIG. 6B, in response to the male portion 52 being inserted sufficiently into the female portion 54, the hem 60 slides past the locking groove 62 and engages the locking groove 62 to secure the male portion 52 in the female portion 54.

Figure 7A:
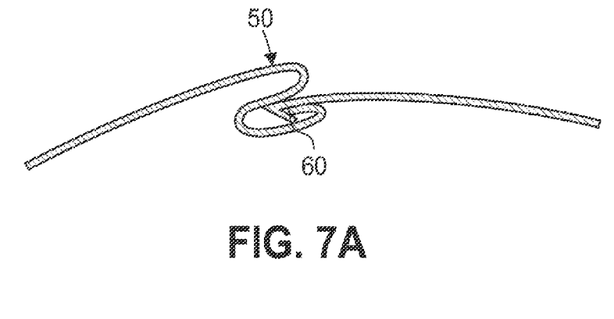
FIG. 7A is a cross-sectional view taken along line 6-6 of FIG. 5 in accordance with another embodiment of the invention.
Figure 7B:
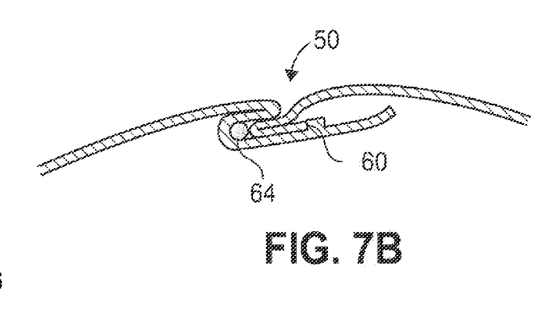
FIG. 7B is a cross-sectional view taken along line 6-6 of FIG. 5 in a locked configuration in accordance with the embodiment of FIG. 7A.

FIG. 7A is a cross-sectional view taken along line 6-6 of FIG. 5 in accordance with another embodiment of the invention. As shown in FIG. 7A, the male portion 52 includes the hem 60 and the female portion 54 includes the locking groove 62. Alternatively, the longitudinal lock 50 may include a button lock. In addition, the female portion 54 includes a sealant 64 disposed in a channel 66. As shown in FIG. 7B, in response to the male portion 52 being inserted sufficiently into the female portion 54, the male portion 52 is pressed against the sealant 64 to form a seal and the hem 60 slides past the locking groove 62 and engages the locking groove 62 to secure the male portion 52 in the female portion 54.

Figure 8:
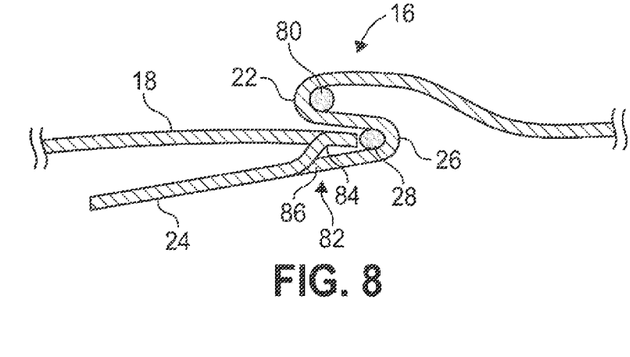
FIG. 8 is a cross-sectional view taken along line 4-4 of FIG. 1 in a locked configuration in accordance with another embodiment of the invention.

FIG. 8 is a cross-sectional view taken along line 4-4 of FIG. 1 in a locked conformation in accordance with another embodiment of the invention. As shown in FIG. 8, the pipe and fitting coupling system 10 optionally includes a sealant 80 in a groove corresponding to the back side of the first axial flange 22. If included, the sealant 80 is configured to reduce or eliminate air leakage at the intersection zone 56. That is, by placing in the groove corresponding to the back side of the first axial flange 22, air leakage at the intersection zone 56 has been reduced based upon empirical testing.

Also shown in FIG. 8, the pipe and fitting coupling system 10 optionally includes a lock transverse 82 disposed at the joint 16 configured to secure the plain end 18 in the receiving end 20. In general, the transverse lock 82 includes any suitable locking structure(s) such as tabs, barbs, hems, locking grooves, buttons, dimples, hooks, catches, detents, and the like. In a particular example, the plain end 18 includes a hem 84 and the receiving end 20 includes a locking groove 86. In various examples, the hem 84 and locking groove 86 may be configured to releasably engage or substantially non-releasably engage (that is, the engagement may be sufficiently secure such that uncoupling the joint 16 results in a permanent deformation of at least the hem 84 and locking groove 86). In yet another example, the plain end 18 includes a series of the hems 84 or buttons, dimples, and the like spaced about the circumference and the receiving end includes a series of locking grooves or catches spaced about the circumference. In this manner, the transverse lock 82 may be selectively engaged by rotating the plain end 18 relative to the receiving end 20.

Figure 10:
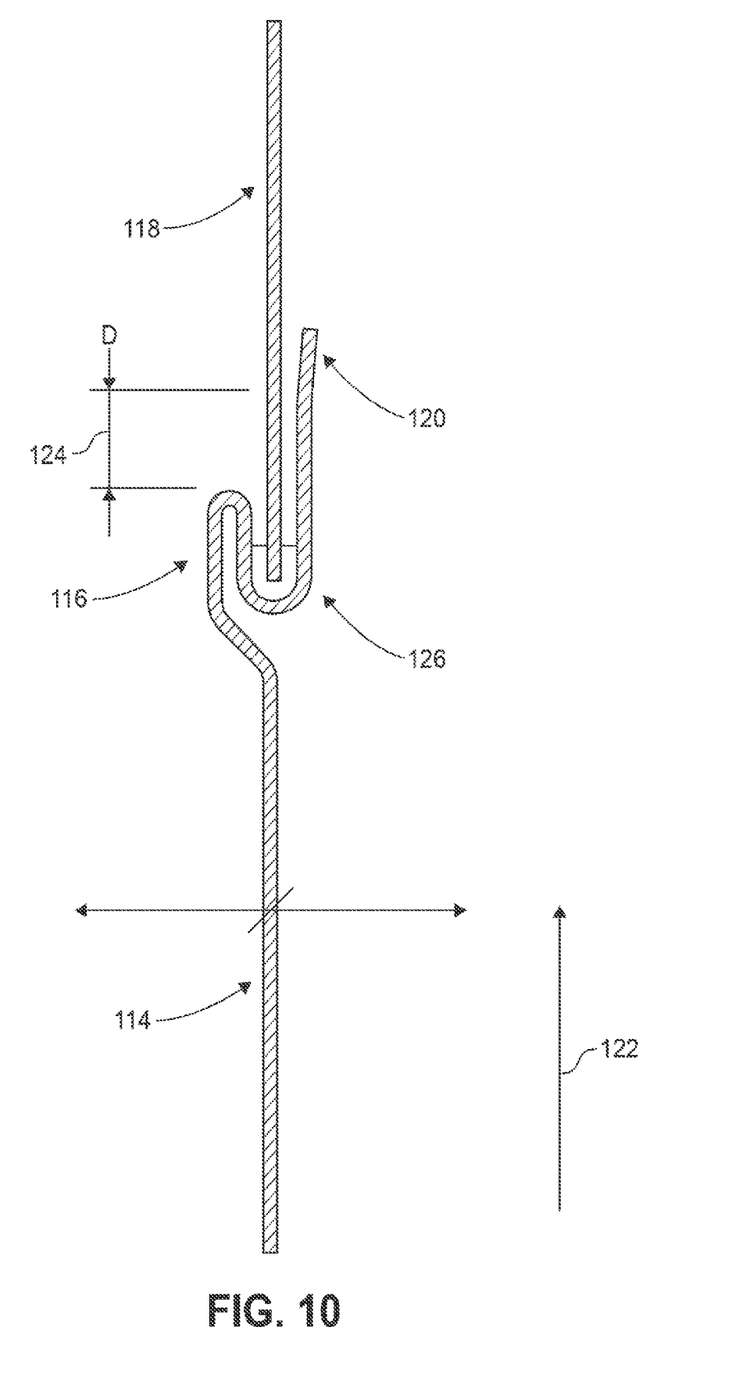
FIG. 10 is a partial cross-sectional view in accordance with an embodiment of the invention.
Figure 11:
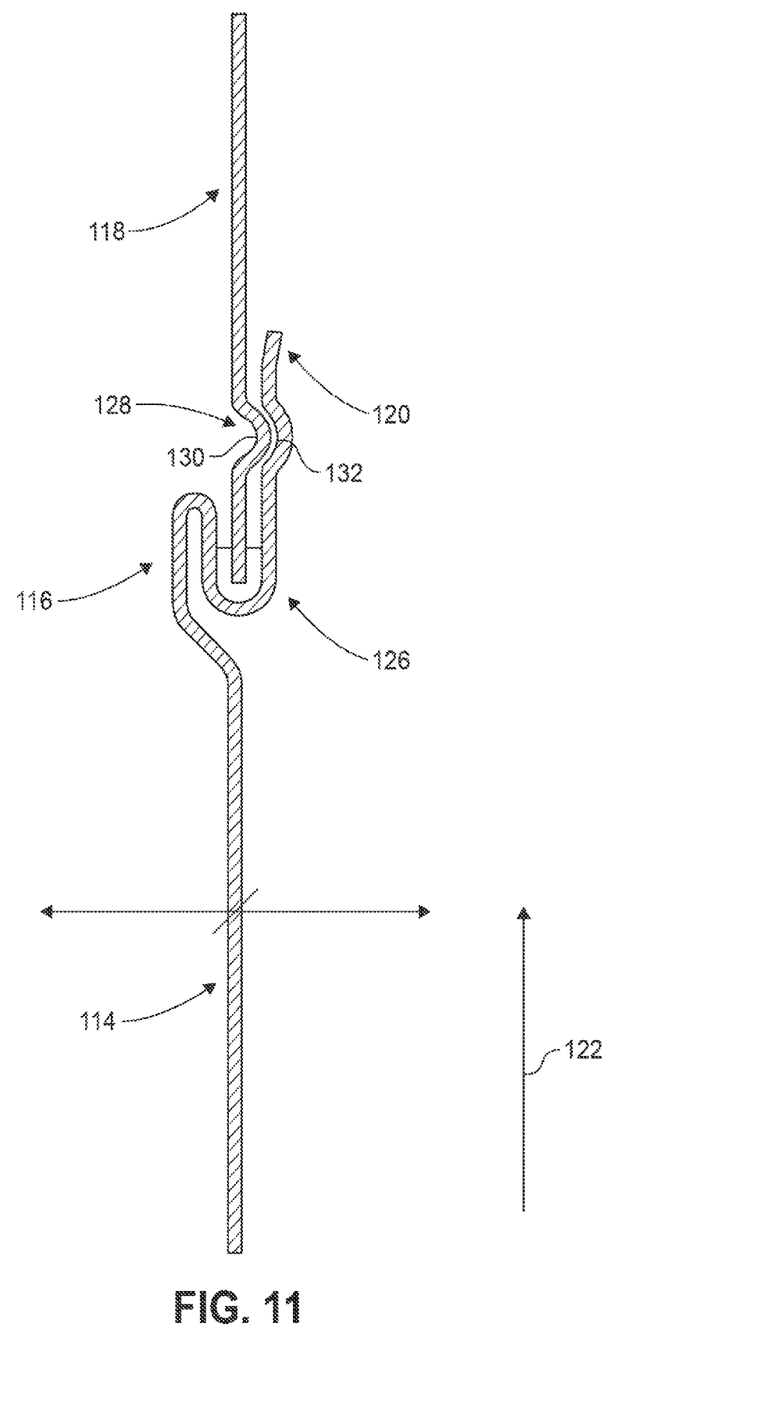
FIG. 11 is a partial cross-sectional in accordance with an embodiment of the invention including a button punch lock.
Figure 12:
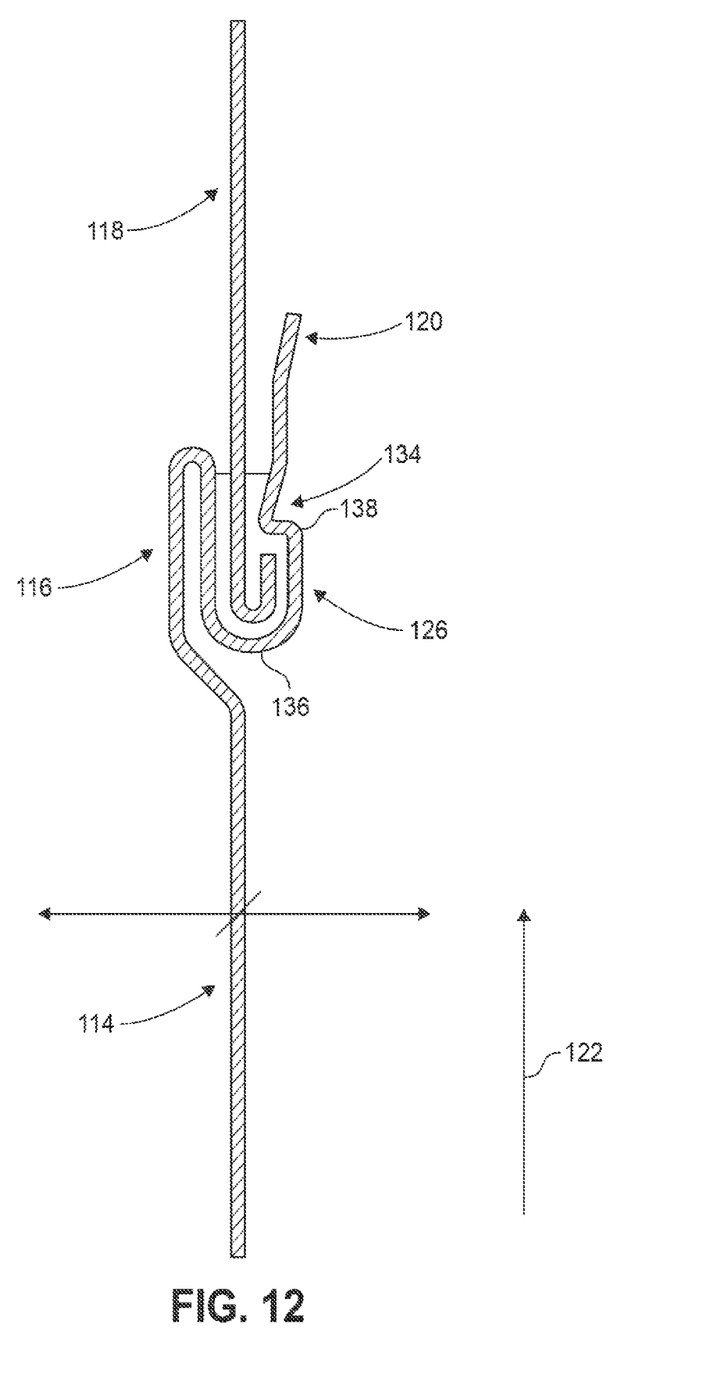
FIG. 12 is a partial cross-sectional view in accordance with an embodiment of the invention including a button snap lock.

FIGS. 10-12 show an assembled upstream pipe section 114 having a roll formed pocket 116 and a downstream pipe section 118 in accordance with embodiments of the invention. A lead-in bevel 120 may be used with or without crimping and the pipe sections may be round or rectangular. The direction of air flow is illustrated by arrow 122. In the embodiment of FIG. 10, the upstream pipe section 114 has a roll formed pocket 116 and a lead-in bevel 120. Area of screw penetration is located at area 124. Manufacturer installed sealant 126 is installed in the roll formed pocket base. FIG. 11 shows another embodiment including a self-locking button punch lock 128 including a hem 130 in the downstream pipe section 118 which locks onto a relieved portion 132 of a button on the upstream pipe section 114. FIG. 12 shows another embodiment of the invention including a button snap lock 134 including a hem 136 in the downstream pipe section 118 which locks onto a relieved portion 138 on the upstream pipe section.

Figure 9:
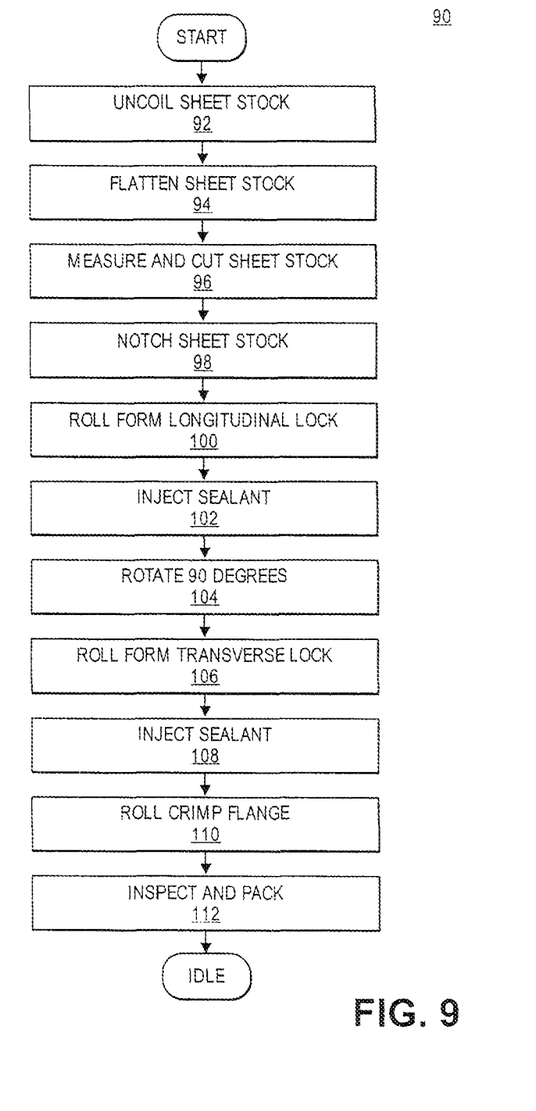
FIG. 9 is a flow diagram of a method of fabricating the pipe and fitting coupling system of FIG. 1.

FIG. 9 is a flow diagram of a method 90 of fabricating the pipe and fitting coupling system of FIG. 1. In general, to fabricate a pipe such as the pipe 12 and 14, a supply of sheet metal is uncoiled with an uncoiler at step 92. The sheet metal is then flattened with a flattener to reduce the coil set, e.g., the tendency of the metal to coil at step 94. At step 96, the sheet metal is measured and cut to the predetermined dimensions by a shear, for example. A notcher removes segments of sheet metal that would otherwise interfere with the longitudinal or transverse locking mechanism at step 98. The notched sheet now travels to a conventional longitudinal lock former via a transfer table. At step 100, the sheet now receives the longitudinal lock 50 such as a "snap" lock shown in FIGS. 6A and 7A or "button" lock mechanism as shown in FIGS. 6B and 7B. One side is roll formed to a female lock, the other side to a male lock. While the locks are being formed, a sealant is injected into the female portion on the lock at step 102. Upon exiting the lock former, the pipe blank travels onto another transfer table that changes the direction of travel by 90 degrees at step 104. At step 106, the pipe blank enters the inventive roll former configured to form the receiving end 20.

In general, structures such as flanges and grooves are formed in sheet stock by passing the stock through a series of rolls or dies. A first roll in the series may initiate a bend and subsequent rolls accentuate the structure. In order to fabricate the receiving end 20, the receiving end 20 is 'flared' or otherwise formed with a die and/or rolls to generate an outwardly angled face 38. In general, the outwardly angled face 38 increases the diameter of the pipe from the diameter D to the diameter $D^1$. Once the outwardly angled face 38 is formed, the first axial flange 22, the axial groove 26 and second axial flange 24 are formed by passing the receiving end 20 through one or a series of rolls or dies. Following step 106, the sealant 28 is injected or otherwise disposed in the axial groove 26 at step 108. The blank then travels to a crimper machine and the series of crimps 36 may be formed in the second axial flange 24 at step 110. Following fabrication, the completed pipe 12 exits onto a run-out table where it is inspected and then packaged at step 112.

Alternatively, the pipe and fitting coupling system may be fabricated via a molding or casting process. For example, as is generally known, a negative mold of the pipe 12 may be generated and a material may be introduced to the mold to form the pipe 12.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A pipe and fitting coupling system comprising:
   a. a first pipe having a plain end;
   b. a second pipe having an axial direction towards the first pipe, and further having a receiving end, the receiving end being a single piece of shaped sheet metal and comprising;
      i. a first flange having an inwardly facing face;
      ii. a second flange having an outwardly facing face;
      iii. a groove disposed between the inwardly facing face of the first flange and the outwardly facing face of the second flange, wherein the first flange and the second flange extend in the axial direction from the groove, the second flange extending further in the axial direction than the first flange;
      iv. a sealant disposed in the groove to seal the plain end in the receiving end; and
   c. wherein a joint is formed by the cooperative alignment of the plain end inserted over the outwardly facing face of the second flange and into the groove in the receiving end and against the sealant within the groove.

2. The pipe and fitting coupling system according to claim 1, further comprising:
   a. a transverse lock disposed at the joint to secure the plain end in the receiving end, the transverse lock including a hem disposed at the plain end and a locking groove disposed at the receiving end, the hem and locking groove being configured to engage one another.

3. The pipe and fitting coupling system according to claim 1, further comprising:
   a. a longitudinal lock including a male portion and a female portion disposed at opposing longitudinal edges of each pipe, the longitudinal lock being configured to secure the opposing longitudinal edges of each pipe together in response to the male portion being inserted into the female portion.

4. The pipe and fitting coupling system according to claim 3, wherein the female portion of the longitudinal lock includes a channel, and wherein a sealant is disposed in the channel to seal the male end of the longitudinal lock to the female end of the longitudinal lock.

5. The pipe and fitting coupling system according to claim 4, further comprising a second groove corresponding to the opposite side of the first flange, and wherein a sealant is disposed in the second groove to reduce leakage.

6. The pipe and fitting coupling system according to claim 1, further comprising:
   a. a fastener disposed at the joint and configured to extend radially inwardly through a wall of the plain end and a wall of the second flange to secure the first pipe to the second pipe.

7. The pipe and fitting coupling system according to claim 6, wherein the fastener is a sheet metal screw configured to pierce the wall of the plain end and pierce the wall of the second flange to secure the first pipe to the second pipe.

8. The pipe and fitting coupling system according to claim 1, further comprising:
   a. a series of crimps disposed about the second flange.

9. The pipe and fitting coupling system according to claim 8, further comprising:

a. a tapered segment formed by series of crimps disposed about the second flange to facilitate telescoping the second flange into the plain end.

10. The pipe and fitting coupling system according to claim 1, wherein the inwardly facing face is inwardly angled to meet the groove and the outwardly angled face is outwardly angled to meet the groove.

11. The pipe and fitting coupling system according to claim 1, wherein the groove has two legs connected by a base; wherein the first flange and the second flange each form one of the two legs; and wherein the sealant is disposed in the base of the groove.

12. The pipe and fitting coupling system according to claim 11, wherein the plain end is encapsulated between the two legs and the base of the groove.

13. The pipe and fitting coupling system according to claim 1, wherein the receiving end of the second pipe comprises a first receiving end, and wherein the second pipe further comprises a second receiving end opposite the first receiving end.

14. A method of making a pipe and fitting coupling system, the method comprising the steps of:
   a. forming a plain end in a first pipe; and
   b. forming a receiving end in a second pipe, the second pipe having an axial direction towards the first pipe, the receiving end being a single piece of shaped sheet metal and forming the receiving end comprises the steps of;
   c. forming a first flange having an inwardly facing face;
   d. forming a second flange having an outwardly facing face;
   e. forming a groove between the inwardly facing face of the first flange and the outwardly facing face of the second flange, wherein the first flange and the second flange extend in the axial direction from the groove, the second flange extending further in the axial direction than the first flange;
   f. disposing a sealant in the groove to seal the plain end in the receiving end; and
   g. forming a joint by cooperatively aligning the plain end over the outwardly facing face of the second flange and into the groove in the receiving end against the sealant within the groove.

15. The method according to claim 14, further comprising the step of:
   a. forming a transverse lock disposed at the joint to secure the plain end in the receiving end, the transverse lock including a hem disposed at the plain end and a locking groove disposed at the receiving end, the hem and locking groove being configured to engage one another.

16. The method according to claim 14, further comprising the step of:
   a. forming a longitudinal lock including a male portion and a female portion disposed at opposing longitudinal edges of each pipe, the longitudinal lock being configured to secure the opposing longitudinal edges of each pipe together in response to the male portion being inserted into the female portion.

17. The method according to claim 16, wherein the forming the receiving end in a second pipe includes the step of removing a segment of the sheet metal to form a notch to avoid interference with the longitudinal lock.

18. The method according to claim 16, further comprising the step of disposing a sealant in a channel of the female portion of the longitudinal lock to seal the male end of the longitudinal lock to the female end of the longitudinal lock.

19. The method according to claim 18, further comprising the step of disposing a sealant in a second groove corresponding to the opposite side of the first flange to reduce leakage.

20. The method according to claim 14, further comprising the step of:
   a. securing the joint with a fastener configured to extend radially inwardly through a wall of the plain end and a wall of the second flange.

21. The method according to claim 20, wherein the securing the joint with a fastener step comprises:
   a. piercing the wall of the plain end and the wall of the second flange with a sheet metal screw to secure the first pipe to the second pipe.

22. The method according to claim 14, further comprising the step of:
   a. forming a series of crimps disposed about the second flange.

23. The method according to claim 22, further comprising the step of:
   a. forming a tapered segment defined by the series of crimps disposed about the second flange to facilitate telescoping the second flange into the plain end.

24. The method according to claim 14, wherein inwardly facing face is inwardly angled to meet the groove and the outwardly facing face is outwardly angled to meet the groove.

25. A method of coupling a plurality of components in a pipe and fitting coupling system, the method comprising the steps of:
   a. orienting a plain end of a first pipe with a receiving end of a second pipe, the second pipe having an axial direction towards the first pipe, the receiving end being a single piece of shaped sheet metal and comprising;
      i. a first flange having an inwardly facing face;
      ii. a second flange having an outwardly facing face;
      iii. a groove disposed between the inwardly facing face of the first flange and the outwardly facing face of the second flange, wherein the first flange and the second flange extend in the axial direction from the groove, the second flange extending further in the axial direction than the first flange; and
      iv. a sealant disposed in the groove to seal the plain end in the receiving end; and
   b. telescopically sliding the plain end over the outwardly facing face of the second flange;
   c. cooperatively aligning the plain end with the groove; and
   d. forming a joint by urging the plain end against the sealant.

26. The method according to claim 25, further comprising the step of:
   a. securing the joint with a transverse lock disposed at the joint, the transverse lock including a hem disposed at the plain end and a locking groove disposed at the receiving end, the hem and locking groove being configured to engage one another.

27. The method according to claim 25, further comprising the step of:
   a. forming each pipe by securing a male portion and a female portion disposed at opposing longitudinal edges of each pipe, wherein the male portion and the female portion form a longitudinal lock, the longitudinal lock being configured to secure the opposing longitudinal edges of each pipe together in response to the male portion being inserted into the female portion.

28. The method according to claim 25, further comprising the step of:
   a. securing the joint with a fastener disposed at the joint and configured to extend radially inwardly through a wall of the plain end and a wall of the second flange to secure the first pipe to the second pipe.

29. The method according to claim 28, wherein the fastener is a sheet metal screw configured to pierce the wall of the plain end and pierce the wall of the second flange to secure the first pipe to the second pipe.

30. The method according to claim 25, wherein the inwardly facing face is inwardly angled to meet the groove and the outwardly facing face is outwardly angled to meet the groove.

31. The method according to claim 27, wherein a sealant is disposed in a channel of the female portion of the longitudinal edge of each pipe, and wherein the forming each pipe step further includes sealing the male portion of the longitudinal edge of each pipe with the sealant in the female portion.

32. The method according to claim 31, wherein a sealant is disposed in a second groove corresponding to the opposite side of the first flange to reduce leakage.

\* \* \* \* \*